US008520865B2

(12) United States Patent
Hayashi

(10) Patent No.: US 8,520,865 B2
(45) Date of Patent: Aug. 27, 2013

(54) DISPLAY APPARATUS, PROJECTOR, AND CONTROL METHOD

(75) Inventor: Naoki Hayashi, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 531 days.

(21) Appl. No.: 12/619,802

(22) Filed: Nov. 17, 2009

(65) Prior Publication Data

US 2010/0125793 A1 May 20, 2010

(30) Foreign Application Priority Data

Nov. 18, 2008 (JP) ................................ 2008-294246

(51) Int. Cl.
*H04R 3/00* (2006.01)
(52) U.S. Cl.
USPC ............................................ 381/122; 353/15
(58) Field of Classification Search
USPC ..................... 381/122, 111; 700/94; 353/15; 715/716, 771; 345/156
See application file for complete search history.

(56) References Cited

U.S. PATENT DOCUMENTS

| 5,902,115 A * | 5/1999 | Katayama ................. 434/307 A |
| 5,940,520 A * | 8/1999 | Endo .............................. 381/111 |
| 7,836,216 B2 * | 11/2010 | Kashi et al. ...................... 710/15 |
| 7,912,501 B2 * | 3/2011 | Johnson et al. ............. 455/556.1 |
| 2006/0258400 A1 * | 11/2006 | Lee ................................ 455/557 |
| 2007/0033626 A1 * | 2/2007 | Yang et al. .................... 725/105 |
| 2007/0269058 A1 * | 11/2007 | Akino ........................... 381/113 |
| 2008/0040108 A1 * | 2/2008 | Nakagawa et al. ........... 704/231 |
| 2008/0317262 A1 * | 12/2008 | Schlichting ................... 381/113 |
| 2009/0036158 A1 * | 2/2009 | Fujinawa et al. .......... 455/556.1 |
| 2009/0296952 A1 * | 12/2009 | Pantfoerder et al. ............ 381/74 |
| 2010/0302467 A1 * | 12/2010 | Nagaharu ..................... 348/759 |
| 2011/0182442 A1 * | 7/2011 | McDonald et al. .......... 381/109 |

FOREIGN PATENT DOCUMENTS

| JP | 8-321164 A | | 12/1996 |
| JP | 09-083274 A | | 3/1997 |
| JP | 11-027786 A | | 1/1999 |
| JP | 2003-116193 | * | 4/2003 |
| JP | 2003-116193 A | | 4/2003 |

* cited by examiner

*Primary Examiner* — Alexander Jamal
(74) *Attorney, Agent, or Firm* — ALG Intellectual Property, LLC

(57) ABSTRACT

A display apparatus includes an image display device adapted to form an optical image, a microphone jack adapted to connect with an external microphone, and an OSD controller adapted to prepare OSD screen image data about the external microphone to supply to the image display device.

8 Claims, 9 Drawing Sheets

FIG. 4A
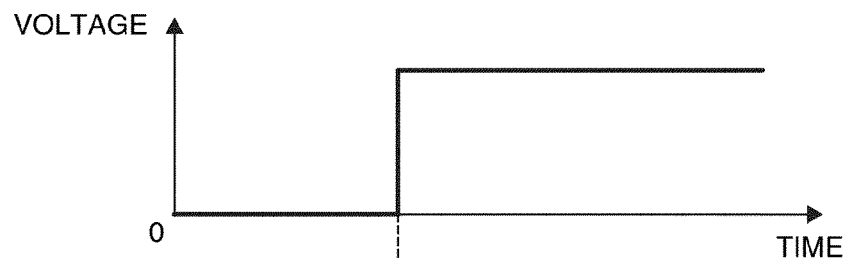
FIG. 4B
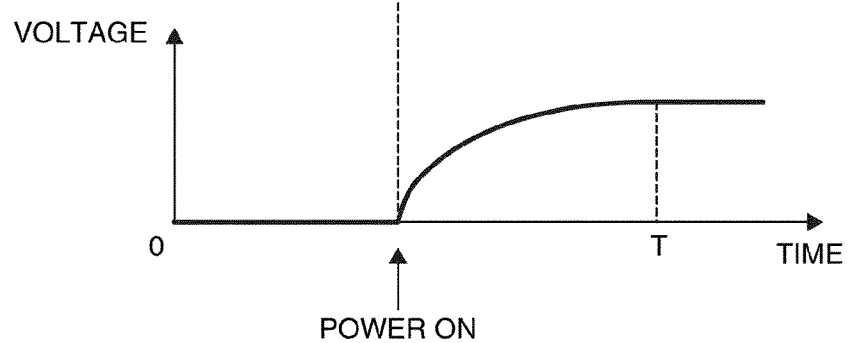
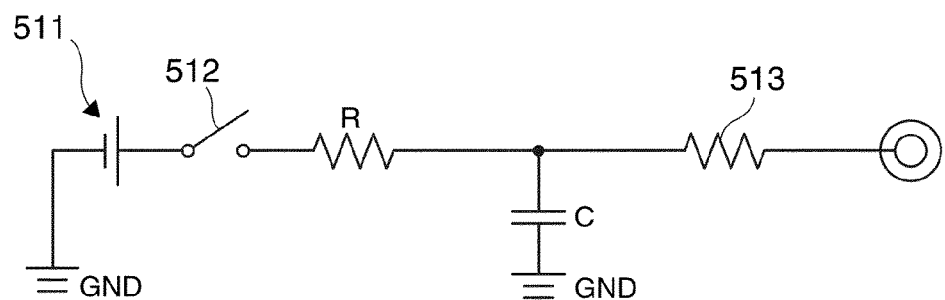
FIG. 5

_US 8,520,865 B2_

DISPLAY APPARATUS, PROJECTOR, AND CONTROL METHOD

The entire disclosure of Japanese Patent Application No. 2008-294246, filed Nov. 18, 2008 is expressly incorporated by reference herein.

BACKGROUND

1. Technical Field

The present invention relates to a display apparatus, a projector, a power supply device, and a power supply method.

2. Related Art

In the past, as types of a microphone as an external microphone to be connected to a microphone jack, there have been two prominent types, namely dynamic microphone and condenser microphone. It has been known that either one of these microphones is connected to a jack section (a microphone jack), and a sound is then output from a speaker or the like (see, e.g., JP-A-8-321164).

Incidentally, the condenser microphone has a specification of requiring electric power, while the dynamic microphone has a specification of not requiring electric power.

However, according to the invention described in JP-A-8-321164, since it is arranged that either of the condenser microphone and the dynamic microphone can be connected to one microphone jack, breakdown might occur in the case in which the dynamic microphone is connected to the microphone jack supplied with the electric power. In particular, in the case in which it is difficult to make a presentation only with existing equipment, such as the case of a large site or the case of a trip destination, it is necessary to obtain the necessary equipment in the field, and therefore, the possibility of breakdown rises further.

SUMMARY

An advantage of some aspects of the invention is to provide a display apparatus, a projector, and a control method capable of reliably preventing breakdown of an external microphone.

One of the aspect of this invention is directed to provide a display apparatus including an image display device adapted to form an optical image, a microphone jack adapted to connect with an external microphone, and an on-screen display ("OSD") controller adapted to prepare OSD screen image data about the external microphone to supply to the image display device.

According to this aspect of the invention, since the display apparatus is able to display an OSD screen concerning the external microphone, the user can recognize and configure the setting of the external microphone through the displayed OSD screen.

In another aspect of the display apparatus further includes an audio processing device adapted to process audio signal input from the external microphone, and a storage device adapted to store control parameters corresponding to a plural of type of the external microphone for controlling the audio processing device, the audio processing device receives the control parameters corresponding to the external microphone.

According to this aspect of the invention, since predetermined control parameters are stored in the storage beforehand, the user of this display apparatus can easily reconfigure the setting based on the appropriate parameters corresponding to the external microphone read out from the storage. Therefore, usability is improved.

In another aspect of the display apparatus further includes a power source device adapted to supply electric power to the external microphone, a switch device adapted to switch power supply of the power source device between ON and OFF, and a control device adapted to control the switch device in accordance with a connected external microphone.

According to this aspect of the invention, electric power applied to the external microphone is controlled by the control device in accordance with the connected external microphone. Therefore, the user of this display apparatus does not have to decide whether power supply supplies electric power to the external microphone.

In another aspect of the display apparatus, it is preferable that the power source device is adapted to supply the external microphone with the electric power via an audio signal line coupled to the microphone jack. Further this aspect of the display apparatus includes a voltage level detection device adapted to detect a voltage level of the audio signal line in a condition in which the power supply from the power source device is ON, the control device controls the switch device in accordance with a type of the external microphone determined based on a detection result of the voltage level detection device.

According to this aspect of the invention, electric power is provided to the external microphone through the audio signal line. Therefore, an extra power line is not necessary for supplying the external microphone the electric power. Incidentally, in the case either of the dynamic microphone and the condenser microphone is connected to the microphone jack, since the impedance value is significantly different between the both types of microphones, a voltage difference is caused in the voltage level of the audio signal line. Therefore, focusing attention on the fact that the voltage difference is caused in the voltage level, it is possible to discriminate between the dynamic microphone and the condenser microphone.

That is, the control device electrically detects the type of the external microphone. Thus, in the case in which the dynamic microphone, which does not need the electric power, is connected to the microphone jack, since the control device switches OFF the switch device, it can be prevented to supply the dynamic microphone with the electric power, thereby reliably preventing the breakdown of the external microphone.

In another aspect of the display apparatus further includes a connection detection device adapted to detect a state of connection between the microphone jack and the external microphone, the control device controls the switch device to switch ON power supply from the power source device in a case in which it is detected that the external microphone is connected to the microphone jack.

According to this aspect of the invention, it becomes possible to supply the external microphone with the power only in the case in which the external microphone is connected to the microphone jack, and therefore, the power can efficiently be supplied because it is not necessary to constantly supply the power.

In another aspect of the display apparatus, it is preferable that the power source device has a switching element, and the control device controls the switching element so as to gradually raise a power supply voltage of the power source device.

As the power source device, a DC/DC converter capable of variably controlling the output in accordance with the duty ratio of the pulse for driving the switching element can be adopted.

According to this aspect of the invention, since the control device controls the duty ratio of the pulse for driving the switching element, thereby gradually raising the power supply voltage when starting supply of the electric power, it is possible to prevent the electric power from being rapidly supplied to the external microphone, thereby reliably preventing the breakdown of the external microphone.

In another aspect of the display apparatus, further includes an integrator adapted to gradually raise a power supply voltage of the power source device.

As the integrator, for example, an RC circuit having a predetermined time constant can be adopted.

According to this aspect of the invention, since it is prevented that the output voltage of the power supply device rises rapidly immediately after switching ON the switch device, the type of the microphone can be determined without damaging the external microphone.

One of the aspect of the invention is directed to a projector including the display apparatus according to any of the aspects of the invention, the image display apparatus includes a light source device, a light modulation device adapted to modulate a light beam emitted from the light source device in accordance with image information to form image light, and a projection optical device adapted to enlargedly project the image light.

According to this aspect of the invention, by using the projection optical device, the OSD screen image that is corresponding to the OSD screen image data produced by the OSD controller is projected enlargedly onto a projection screen, a white board or an wall. Therefore, the OSD screen image is easy to see. Furthermore, this invention is applicable to any type of projector. For example, a mobile projector is preferable to make presentation at a meeting. Occasionally, available equipment at a conference room, however, is not sure. The projector of this invention is suitable to reconfigure the setting for an usable external microphone.

In another aspect of the projector, it is preferable that the OSD controller produces the OSD screen image data after the external microphone is detected.

According to this invention, the OSD screen image includes useful information to adjust a parameter related to the detected external microphone.

In another aspect of the projector, it is preferable that an OSD screen image corresponding to the OSD screen image data produced by the OSD controller includes a user interface for adjusting a volume level of the external microphone.

According to this invention, the projector of this invention projects a user interface for adjusting the volume of the external microphone when the external microphone is detected. Therefore, the usability is improved.

In another aspect of the projector, it is preferable that an OSD screen image corresponding to the OSD screen image data produced by the OSD controller includes a message indicating a type of the external microphone.

According to this invention, the projector of this invention announces the type of the detected external microphone through the OSD screen. That is, the user of the projector of this invention can realize a sort of the external microphone immediately.

In another aspect of the projector, it is preferable that an OSD screen image corresponding to the OSD screen image data produced by the OSD controller includes an indicator representing a status of the electric power to the external microphone.

According to this invention, the user of the projector of this invention is able to recognize the type of the external microphone in use since the status of electric power to the external microphone is indicated in the OSD screen.

One of the aspect of the invention is directed to a control method of a display apparatus. The method includes providing an image display device adapted to form an optical image, providing a microphone jack adapted to connect with an external microphone, preparing OSD screen image data about the external microphone, and supplying the OSD screen image data to the image display device.

According to this aspect of the invention, substantially the same advantages as in the display apparatus described above can be obtained.

BRIEF DESCRIPTION OF THE DRAWINGS

The invention will now be described with reference to the accompanying drawings, wherein like numbers reference like elements.

FIGS. 4A and 4B are graphs showing a variation of a voltage after powering ON the projector.

FIG. 5 is a circuit diagram showing an integrator formed of an RC circuit.

DESCRIPTION OF EXEMPLARY EMBODIMENTS

First Embodiment

Figure 1:
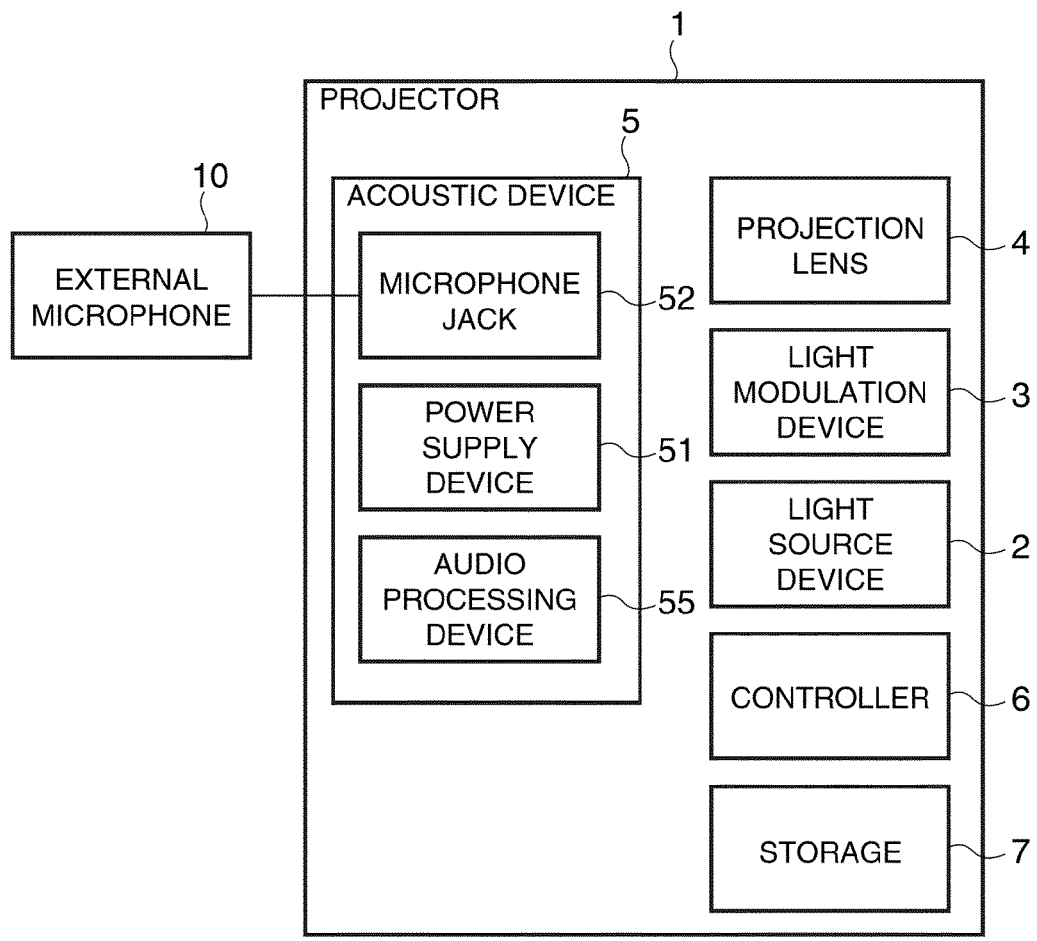
FIG. 1 is a block diagram showing a projector according to a first embodiment of the invention.

A first embodiment of the invention will hereinafter be explained with reference to the accompanying drawings.
Schematic Configuration of Projector FIG. 1 is a block diagram schematically showing a projector 1 according to the present embodiment.

The projector 1 is mainly composed of a light source device 2, a light modulation device 3, a projection lens 4 as a projection optical device, an acoustic device 5, a controller 6, and a storage 7. The projector 1 is for forming image light by modulating a light beam emitted from the light source device 2 using the light modulation device 3, and enlargedly projecting the image light on a projection surface such as a screen using the projection lens 4.

The light source device 2 is provided with a light source lamp such as a high-pressure mercury lamp or a solid light source such as an LED, and a reflector such as a reflecting mirror, and irradiating the light modulation device 3 with the light beam.

Although omitted from the drawings, the light modulation device 3 is configured having a liquid crystal panel for modulating the light beam emitted from the light source device 2 to form the image light, and a driver for driving the liquid crystal panel in accordance with a drive signal input thereto. It should be noted that the light modulation device 3 is not limited to the configuration provided with the liquid crystal panel, but there can be adopted a configuration including a constituent other than the liquid crystal panel such as a device using a micromirror.

The projection lens 4 is for enlargedly projecting the image light, which is formed by the light modulation device 3, on the projection surface, and is configured as a combination lens provided with a lens tube and a plurality of lenses housed in the lens tube.

The controller 6 performs as an OSD controller for preparing OSD screen image data which is supplied to the light modulation device 3. The storage 7 stores control parameters for acoustic device 5. The controller 6 has a function to provide the acoustic device 5 the control parameters read out from the storage 7.

Configuration of Acoustic Device

Figure 2:
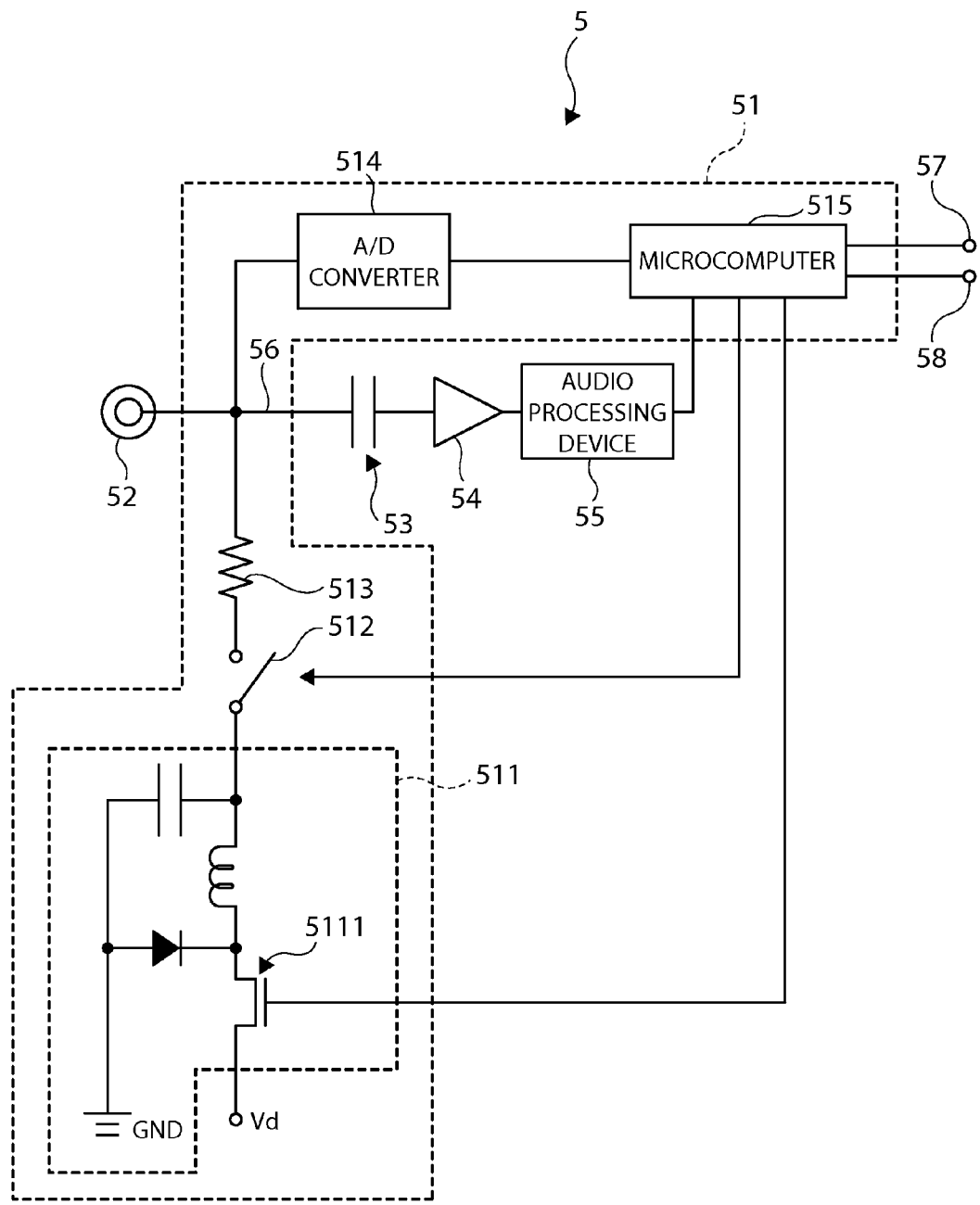
FIG. 2 is a circuit diagram showing an acoustic device provided to the projector.

FIG. 2 is a diagram showing a circuit configuration of the acoustic device 5.

As shown in FIGS. 1 and 2, the acoustic device 5 is mainly composed of a power supply device 51, a microphone jack 52, a capacitor 53, a microphone amplifier 54, and an audio processing device 55, and the members 51 through 55 are connected to each other via an audio signal line 56. This acoustic device 5 processes the audio signal, which is output from an external microphone 10 connected to the microphone jack 52, by the audio processing device 55, and then outputs a sound corresponding to the audio signal from a speaker or the like not shown in the drawings.

Here, the external microphone 10 is, for example, a dynamic microphone or a condenser microphone.

The power supply device 51 switches ON or OFF the power supply to the external microphone 10 in accordance with the type of the external microphone 10. Details of the power supply device 51 will be described later.

The microphone jack 52, to which the external microphone 10 is connected, is connected to the audio signal line 56. The microphone jack 52 outputs the sound, which is input to the external microphone 10, to the audio signal line 56 as the audio signal.

The capacitor 53 is called a coupling capacitor, and for blocking a direct current component included in the audio signal input to the audio signal line 56. Thus, breakdown of the speaker connected to the posterior stage of the audio signal line 56 is prevented.

The microphone amplifier 54 amplifies the audio signal output from the external microphone 10, and outputs the sound from the speaker via the audio processing device 55.

The audio processing device 55 processes the audio signal input from the external microphone 10 connected to the microphone jack 52, and outputs the result to the speaker.

Configuration of Power Supply Device

As shown in FIG. 2, the power supply device 51 is provided with a power source device 511, a power source changing-over switch 512 as a switching device, a bias resistor 513, an A/D converter (hereinafter described as ADC) 514 as a voltage level detection device, and a microcomputer 515 as a control device.

In the present embodiment, the power source device 511 is a DC/DC converter having a switching element 5111, and supplies the external microphone 10 with the electric power via the power source changing-over switch 512, the bias resistor 513, the audio signal line 56, and the microphone jack 52. It should be noted that as the switching element 5111, a field-effect transistor and a bipolar transistor can be adopted.

The power source changing-over switch 512 switches ON or OFF the power supplied from the power source device 511 to the external microphone 10 in accordance with the command from the microcomputer 515.

As the bias resistor 513 connected to the audio signal line 56, a resistor of several kΩ is used. Thus, the electric power is supplied to the external microphone 10 via the audio signal line 56 and the microphone jack 52 while the bias resistor 513 drops the voltage of the electric power supplied from the power source device 511.

The ADC 514 outputs the value, which is obtained by quantizing the signal voltage of the audio signal line 56 with an appropriate number of bits, as the voltage value V.

Figure 3:
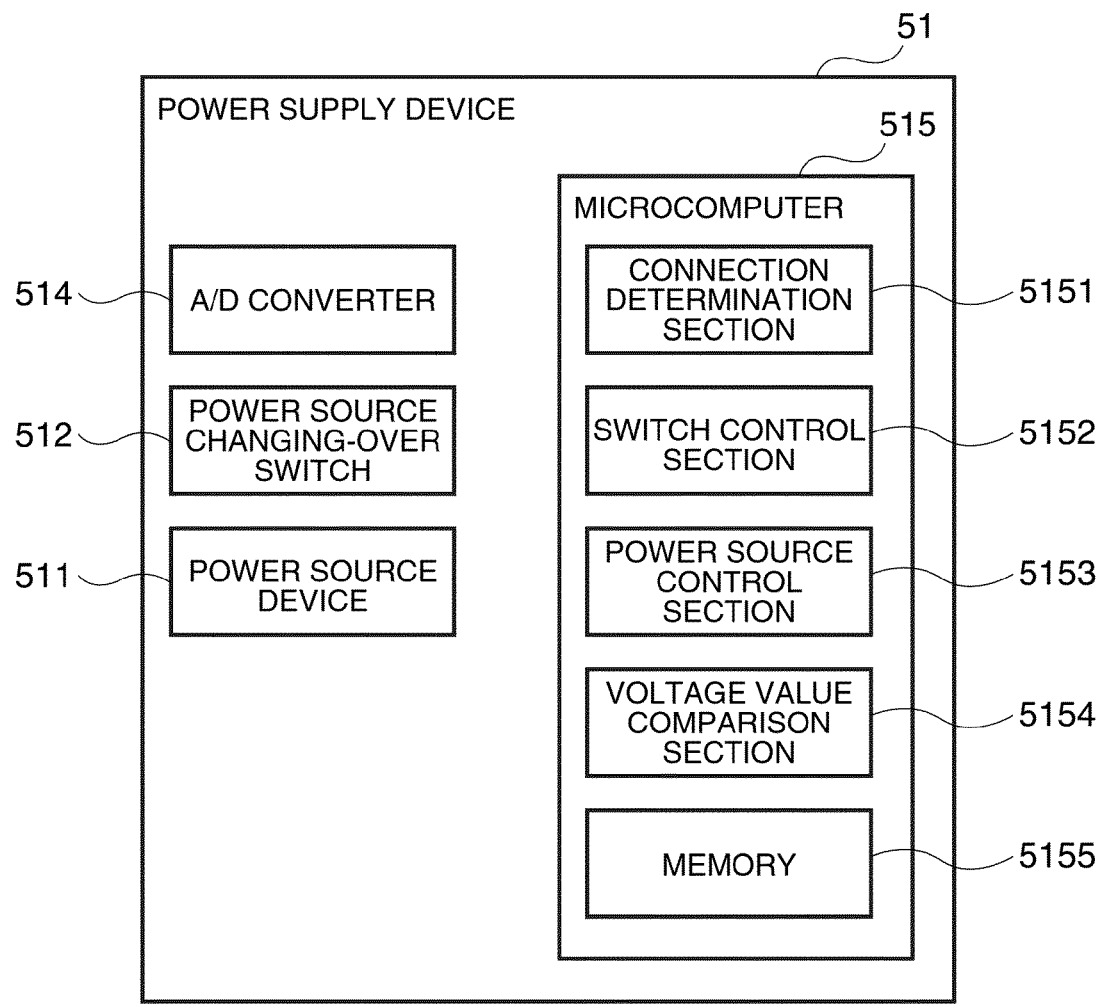
FIG. 3 is a block diagram showing a power supply device provided to the acoustic device.

FIG. 3 is a block diagram of the power supply device 51.

The microcomputer 515 is provided with a central processing unit (CPU) and so on, and performs control of the power supply to the external microphone 10. As shown in FIG. 3, the microcomputer 515 is provided with a connection determination section 5151 as a connection detection section, a switch control section 5152, a power source control section 5153, a voltage value comparison section 5154, and the memory 5155. The microcomputer 515 switches the power source changing-over switch 512 between ON and OFF based on the voltage value V input from the ADC 514. Further, the microcomputer 515 controls the switching element 5111 to control the power supply voltage of the power source device 511. A pulse width modulation (PWM) signal can be used for the control of the switching element 5111. The microcomputer 515 is connected with an external microphone classification information output terminal 57, a control parameter input terminal 58 and the audio processing device 55.

Among the constituents described above, the memory 5155 is configured including a read only memory (ROM) and a random access memory (RAM). The memory 5155 stores a predetermined reference voltage value $V_0$ (a voltage value forming a reference for determining between the dynamic microphone and the condenser microphone), various programs necessary for controlling the acoustic device 5, and so on.

The connection determination section 5151 determines whether or not the external microphone 10 is connected to the microphone jack 52. If the external microphone 10 is connected, the connection determination section 5151 outputs a signal to the switch control section 5152. In the method for determining whether or not the external microphone 10 is connected, the connection determination section 5151 determines whether or not the external microphone 10 is connected to the microphone jack 52 based on the signal output from the detector (not shown) provided to the microphone jack 52.

When the signal is output from the connection determination section 5151, the switch control section 5152 switches ON the power source changing-over switch 512. Here, the power source control section 5153 controls the duty ratio of the PWM signal applied to the switching element 5111 so that the power supply voltage rises gradually, thereby gently raising the power supply voltage. Further, the voltage value comparison section 5154 makes the ADC 514 measure the voltage value V.

FIG. 4A is a graph of the power supply voltage in the related art, and FIG. 4B is a graph of the power supply voltage controlled by the power source control section 5153 so that the voltage rises gradually.

When the power source changing-over switch 512 is switched ON, the power source control section 5153 gradually raises the power supply voltage supplied to the audio signal line 56, and fixes it to be a predetermined voltage after time T has elapsed, and therefore, the rapid rise of the power supply voltage shown in FIG. 4A does not occur.

When the power source changing-over switch 512 is switched ON, the voltage value comparison section 5154 compares the voltage value V obtained from the ADC 514 with the reference voltage value $V_0$ stored in the memory 5155. Since the impedance value of the dynamic microphone, which is several hundreds Ω, for example, and the impedance value of the condenser microphone, which is several tens kΩ, for example, are significantly different from each other, it is possible to discriminate the type of the external microphone 10 connected to the microphone jack 52 based on the voltage value V. If the voltage value V is smaller than the reference voltage value $V_0$, the voltage value comparison section 5154 determines that the external microphone 10 is the dynamic microphone, and then makes the switch control section 5152 switch the power source changing-over switch 512 from ON to OFF. On the other hand, if the voltage value V is larger than the reference voltage value $V_0$, the voltage value comparison section 5154 determines that the external microphone 10 is the condenser microphone, and then keeps the power source changing-over switch 512 ON.

Cooperation between Acoustic Device and Controller

After the type of the external microphone is decided, the microcomputer 515 outputs an external microphone classification information to the external microphone classification information output terminal 57. The external microphone classification information output terminal 57 is connected to the controller 6. The external microphone classification information from the microcomputer 515 through the external microphone classification output terminal 57 is transmitted to the controller 6. The storage 7 stores the control parameters for controlling the audio processing device 55. The control parameters correspond to the type of the external microphone 10 is specified by the controller 6 based on the external microphone classification information. For example, the control parameters may include a cut-off frequency of a filter circuit (not shown) that is included in the audio processing device 55. A sound volume level, or gain value, adjustably set to the type of the external microphone 10 may be included in the control parameters. The storage 7 can be constructed with a non-volatile memory device or a hard disk drive. According to the received external microphone classification information, the controller 6 reads out the control parameters from the storage 7 Then, the controller 6 outputs the control parameters, read out from the storage 7, to the control parameter input terminal 58. Based on the control parameters received through the control parameter input terminal 58, the microcomputer 515 institutes a reconfiguration of audio processing of the audio processing device 55.

Figure 10A:
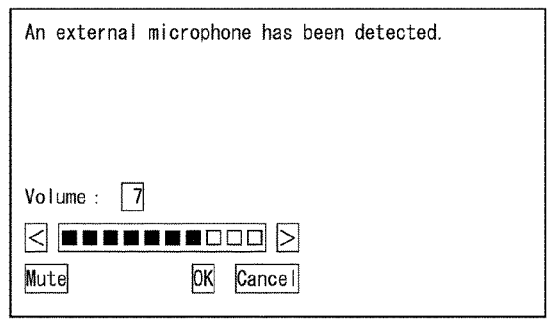
FIG. 10A to 10E are examples of OSD screens projected by a projector according to a third embodiment of the invention.

FIG. 10A is an example of an OSD screen displayed when the external microphone 10 is detected. FIG. 10A notifies the user of the projector 1 that an external microphone has been detected. As presented in FIG. 10A, a user interface for changing the volume of sound from the external microphone 10 is also displayed on the same screen. Therefore, the user can change a volume of the sound immediately. In some cases, the user may not have to know the type of the external microphone 10. Simplified message and user interface are helpful to prompt the user to make operation without confusion.

Figure 10B:
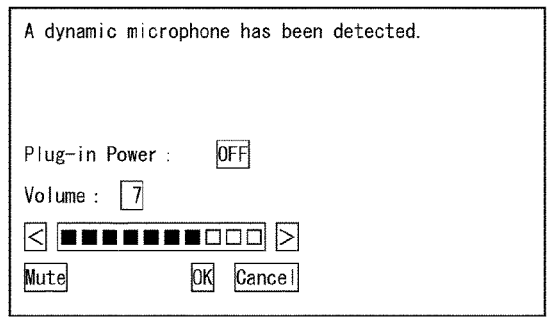
Figure 10C:
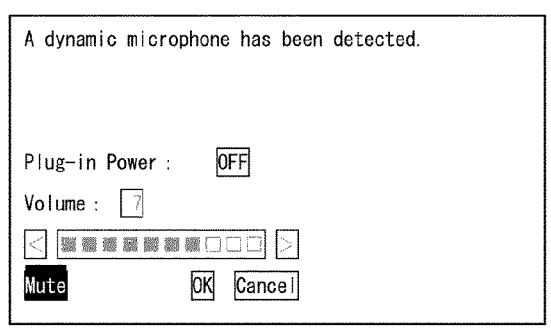

FIG. 10B and FIG. 10C are another examples of OSD screens projected from the projector 1 when the external microphone 10 is detected. In FIG. 10B, the OSD screen shows a message that a dynamic microphone has been detected. A status of a plug-in power, a gain value, or a volume, corresponding to a dynamic microphone follow the message. A user interface for changing the volume is also displayed on the same screen. The user interface comprises a control for adjusting the volume level, a mute button to control the muting of the audio signal output from the audio processing device, an OK button to fix the volume level and a CANCEL button to cancel these configurations. As discussed above, because a dynamic microphone does not require the electric power supply from the external device, the status of the plug-in power is OFF. The mute button is disposed on the OSD screen as a toggle button. The status of muting can be switched by operating the mute button. FIG. 10C shows that a microphone status is mute. The control for adjusting the volume level is forced to be inactive during the muting. The mute button is emphasized. It is acceptable to change the color of the control adjusting the volume level to light gray to indicate the muting status. When the OK button is pushed, the current configuration is fixed and the OSD screen is turned off. If the cancel button is operated, to indicate the configuration is canceled, predetermined messages are displayed on an OSD screen. FIG. 10E is one of an example of screen displayed when the configuration is cancelled. The power supply device 51 may control the power source changing-over switch 512 to turn off the plug-in power when the configuration of the external microphone is canceled. The audio processing device 55 may mute in accordance with the cancel of the configuration.

Figure 10D:
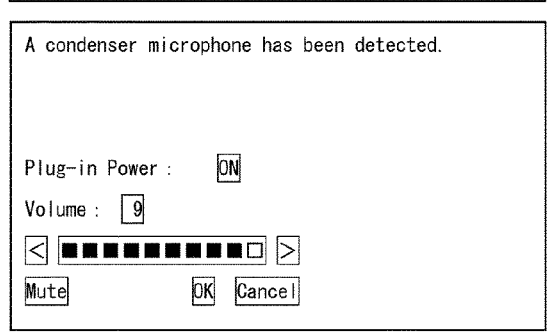
Figure 10E:
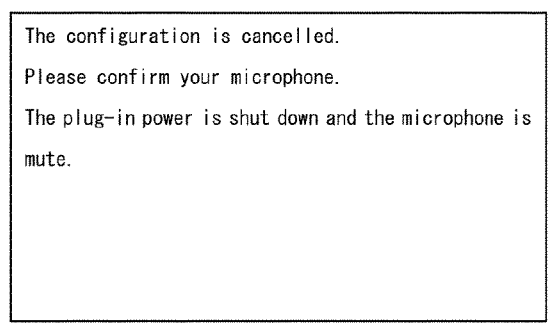

FIG. 10D is an OSD screen projected by the projector 1 when a condenser microphone is connected. In FIG. 10D, the OSD screen shows a message that a condenser microphone has been detected. A status of a plug-in power, a gain value, or a volume, corresponding to a condenser microphone follow the message. A user interface for changing the volume is also displayed. As discussed above, because a condenser microphone requires the electric power supply from the external device, the status of the plug-in power is ON.

Controlling Process

Figure 6:
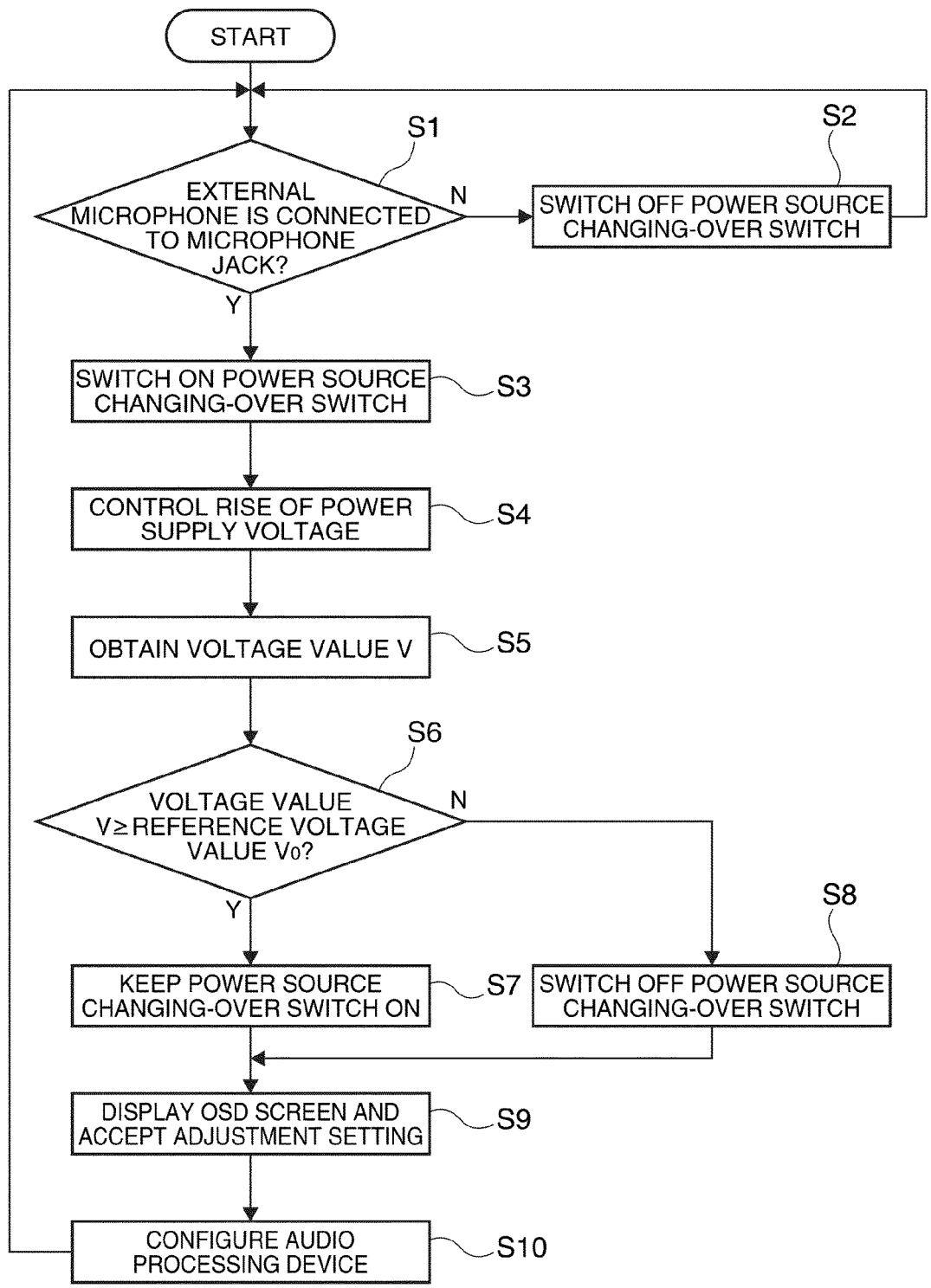
FIG. 6 is a flowchart showing a controlling process of the projector.

FIG. 6 is a flowchart showing a controlling process of the projector 1 according to the present embodiment of the invention.

When the projector 1 is powered on, the connection determination section 5151 of the microcomputer 515 determines whether or not the external microphone 10 is connected to the microphone jack 52, and if it is connected, the connection determination section 5151 outputs the signal to the switch control section 5152 (step S1). If no signal is input, the switch control section 5152 keeps the power source changing-over switch 512 OFF (step S2). The process thereafter returns to the step S1, and then repeats the flow of the step S1 and the step S2 until the external microphone 10 is connected to the microphone jack 52.

On the other hand, if the signal is input, the switch control section 5152 switches ON the power source changing-over switch 512 (step S3). Then, the power source control section 5153 controls the switching element 5111 so as to gradually raise the power supply voltage (step S4). Further, the voltage value comparison section 5154 makes the ADC 514 measure the voltage value V to obtain the voltage value V (step S5). The voltage value comparison section 5154 looks up the reference voltage value $V_0$ in the memory 5155, and then compares the voltage value thus obtained and the reference voltage value $V_0$ with each other (step S6). If the voltage value V is larger than the reference voltage value $V_0$, the voltage value comparison section 5154 keeps the power source changing-over switch 512 ON (step S7), and if the voltage value V is smaller than the reference voltage value $V_0$, then the voltage value comparison section 5154 makes the switch control section 5152 switch the power source changing-over switch 512 from ON to OFF (step S8).

After the determination of the status of the power source changing-over switch 512 (step S7 and S8), the controller 6 prepares OSD screen image data corresponding to the type of the external microphone 10. Then, the controller 6 transmits the prepared OSD screen image data to the light modulation device 3 to display OSD screen corresponding to the OSD screen image data (step S9). In the step S9, the projector 1 accepts the adjustment setting about the external microphone 10. For example, an operation that adjusts the volume of sound from the external microphone 10 is treated in this step. The controller 6 reads out predetermined control parameters in accordance with the detected type of the external microphone 10 from the storage 7. In addition, the controller 6 updates a part of the control parameters in accordance with the operation accepted in the previous step. In this embodiment, the control parameter corresponding to the volume of the sound from the external microphone 10 can be revised. Then, the controller 6 sends the control parameters to the acoustic device 5 to configure the setting of the audio processing device 55 (step s10). The process thereafter returns to the step S1, and repeats the steps S1 through S10 described above.

According to the projector 1 of the first embodiment described above, the following advantages can be obtained.

Since the projector 1 is provided with the microcomputer 515 for switching the power source changing-over switch 512, the voltage value comparison section 5154 of the microcomputer 515 makes the switch control section 5152 switch ON or OFF the power source changing-over switch 512 based on the result of the comparison between the voltage value V thus measured and the reference voltage value $V_0$ stored in the memory 5155. In other words, the microcomputer 515 can discriminate the type of the external microphone 10 in accordance with whether the voltage value V is larger than the reference voltage value $V_0$ defining the reference for discriminating the type of the external microphone 10 or smaller than the reference voltage value $V_0$. In the case in which the external microphone 10 is the dynamic microphone, since the power source changing-over switch 512 is switched OFF to stop the power supply to the audio signal line 56, breakdown of the external microphone 10 can reliably be prevented.

The connection determination section 5151 for detecting whether or not the external microphone 10 is connected to the microphone jack 52 and the power source control section 5153 for gradually raising the power supply voltage after the power supply is switched ON are provided, and when it is detected that the external microphone 10 is connected, the microcomputer 515 makes the power source changing-over switch 512 be switched ON. Thus, it becomes possible to supply the external microphone 10 with the power only in the case in which the external microphone 10 is connected to the microphone jack 52, and therefore, the power can efficiently be supplied because it is not necessary to constantly supply the power. Further, since the power supply voltage is raised gradually when starting supplying the power, the breakdown of the external microphone 10 caused by the rapid voltage variation can reliably be prevented.

As described above, electric power applied to the external microphone is controlled by the microcomputer 515 in accordance with the type of the external microphone 10. Therefore, the user of the projector 1 does not have to decide whether the power supply device 51 supplies electric power to the external microphone 10. In addition, since the projector 1 projects an OSD screen concerning the external microphone 10, the user can recognize and configure the setting of the external microphone 10 through the OSD screen.

Moreover, since predetermined control parameters are stored in the storage 7 beforehand, the user of the projector 1 can easily reconfigure the setting of the external microphone 10 based on the appropriate parameters read out from the storage 7. Therefore, usability is improved.

Second Embodiment

Figure 7:
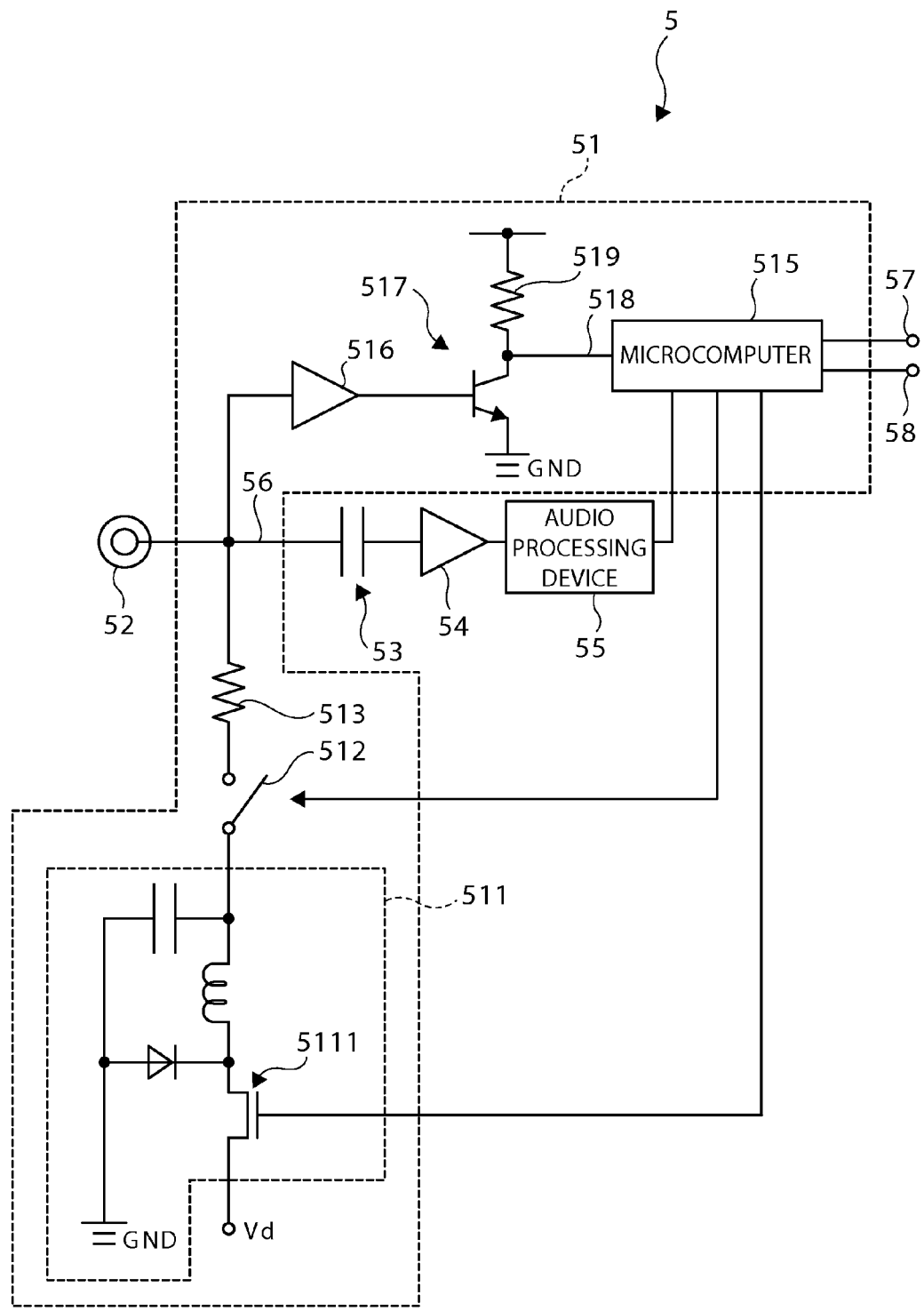
FIG. 7 is a circuit diagram showing an acoustic device according to a second embodiment of the invention.
Figure 8:
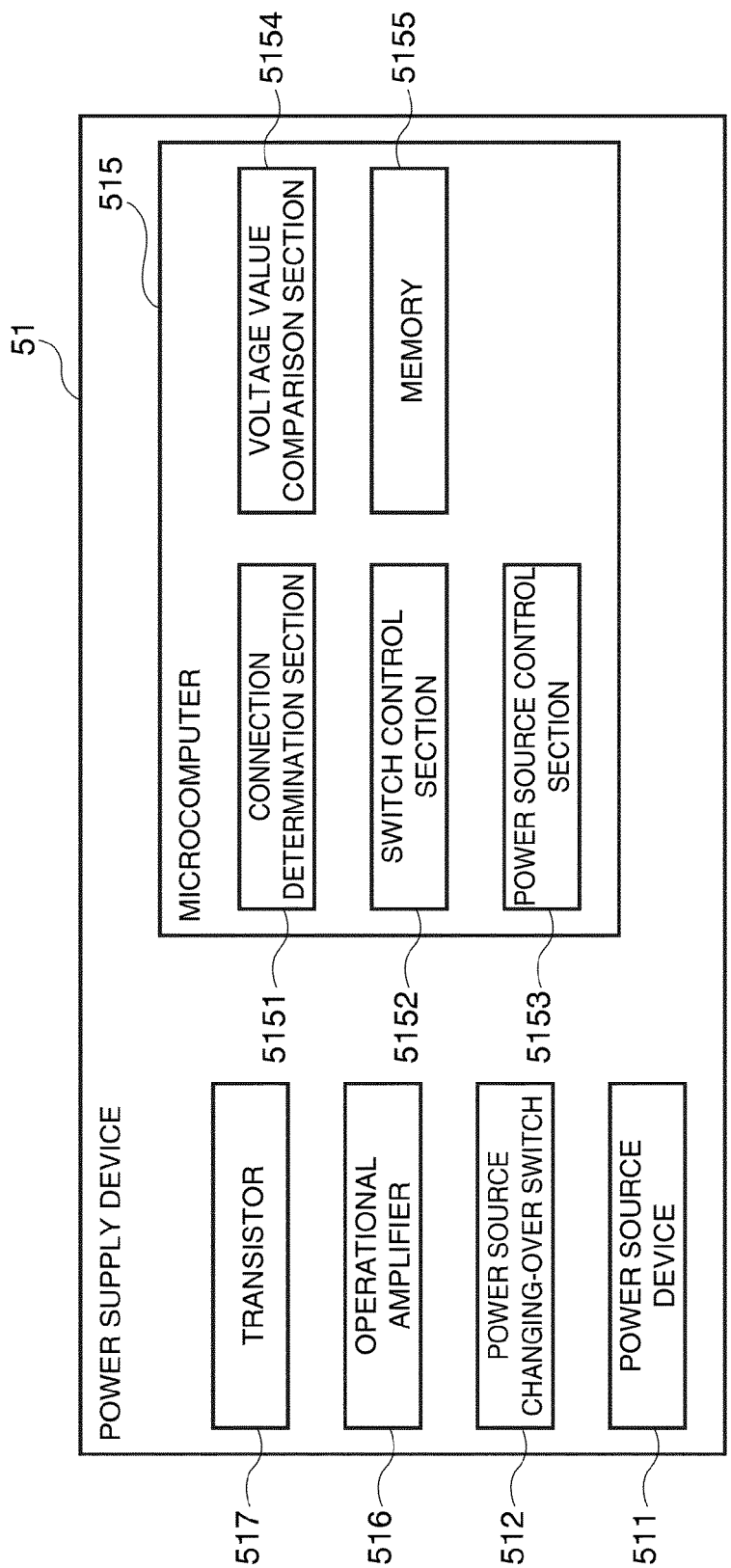
FIG. 8 is a block diagram showing a power supply device provided to the acoustic device.

FIG. 7 is a circuit diagram of an acoustic device 5 provided to a projector 1 according to a second embodiment of the invention, and FIG. 8 is a block diagram of a power supply device 51. In the explanations of the drawings, the constituents common to the previous embodiment are denoted by the same reference numerals, and the explanations therefore will be omitted.

In the present embodiment, the acoustic device 5 is provided with an operational amplifier 516 as a voltage level detection device and an NPN transistor 517 (hereinafter described as a transistor) instead of the ADC 514 used in the first embodiment.

The operational amplifier 516 is an amplifier for amplifying the analog signal from the audio signal line 56, and outputting a voltage value V'.

As shown in FIG. 7, the transistor 517 has terminals of B (base), E (emitter), and C (collector), and the B (base) terminal is connected to an output terminal of the operational amplifier 516, the C (collector) terminal is connected to a direct-current power source not shown via a pull-up resistor 519, and the E (emitter) terminal is connected to the ground (GND). The C (collector) terminal is further connected to the microcomputer 515 via a signal line 518.

The transistor 517 is switched ON or OFF in accordance with the voltage value V' input from the operational amplifier 516.

Specifically, in the case in which the voltage value V' as the input voltage to the B (base) terminal of the transistor 517 is larger than the threshold voltage value of the transistor 517, the transistor 517 becomes in an ON state, and the voltage value $V_C$ of the signal input to the microcomputer 515 via the signal line 518 becomes in the low level.

On the other hand, in the case in which the voltage value V' as the input voltage to the transistor 517 is smaller than the threshold voltage value of the transistor 517, the transistor 517 becomes in an OFF state, and the voltage value $V_C$ of the signal input to the microcomputer 515 via the signal line 518 becomes in the high level.

Figure 9:
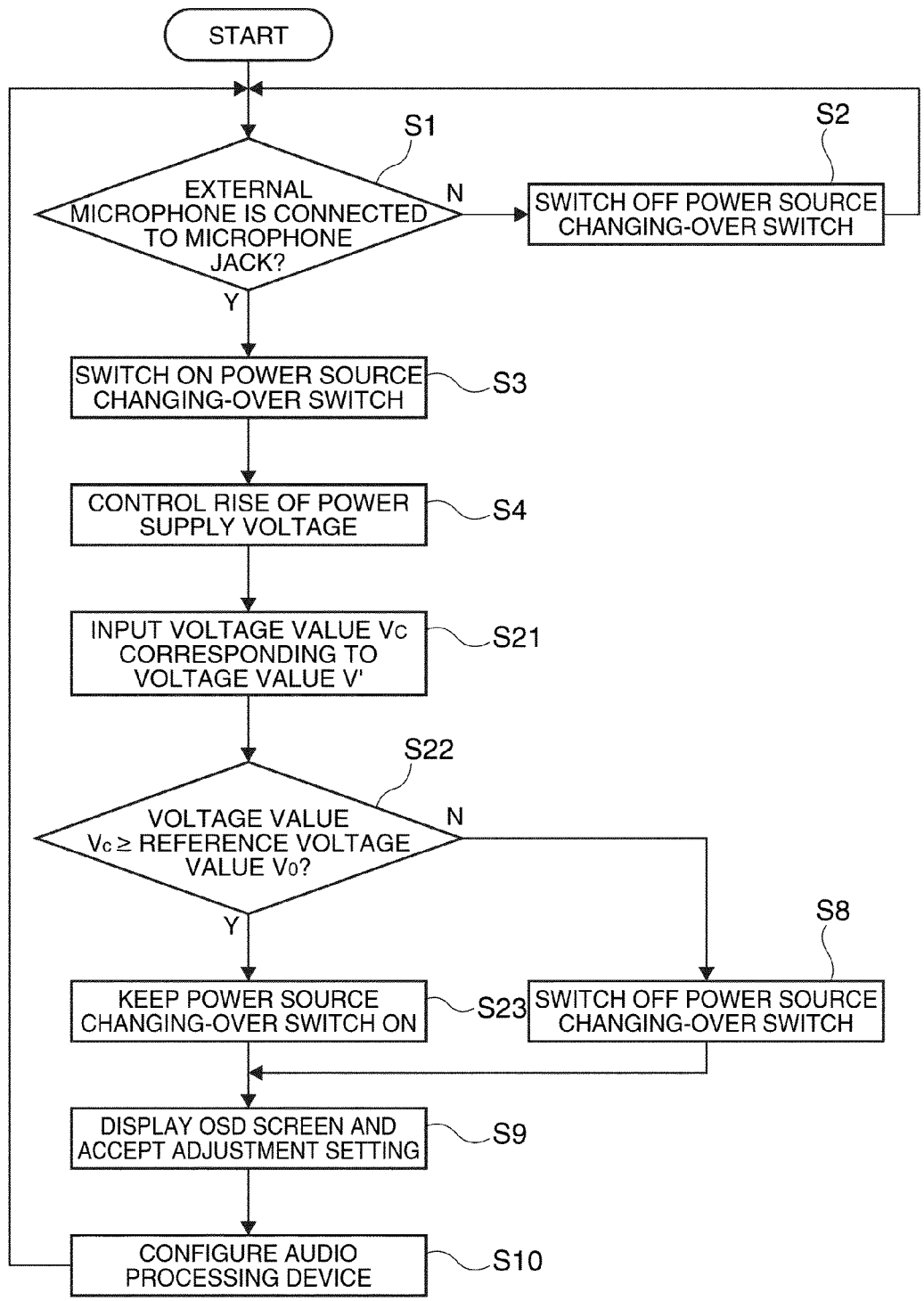
FIG. 9 is a flowchart showing a controlling process of the projector according to a second embodiment of the invention.

FIG. 9 is a flowchart showing a power supply process of the power supply device 51 according to the present embodiment, and the flow different from that of the first embodiment will be explained.

The operational amplifier 516 inputs the voltage value V', which is obtained by amplifying the analog signal from the audio signal line 56, to the B (base) terminal of the transistor 517. The transistor 517 inputs the voltage value $V_C$ corresponding to the voltage value V' to the microcomputer 515 (step S21). The voltage value comparison section 5154 reads out the reference voltage value $V_0$ from the memory 5155, and then compares the voltage value $V_C$ input from the transistor 517 and the reference voltage value $V_0$ with each other (step S22). Based on the result of the comparison, the switch control section 5152 keeps the power source changing-over switch 512 ON if the voltage value $V_C$ is equal to or larger than the reference voltage value $V_0$ (step S23).

On the other hand, if the voltage value VC is smaller than the reference voltage value V0, the switch control section 5152 switches OFF the power source changing-over switch 512 (step S8). After the determination of the status of the power source changing-over switch 512 (step S23 and S8), the step S9 and S10 are executed as same as explained in the first embodiment. The process thereafter returns to the step S1, and repeats from the step S1 to S10 described above.

According to the projector 1 of the second embodiment described above, the following advantages can be obtained.

The projector 1 is provided with the operational amplifier 516 for amplifying the voltage of the audio signal line 56, and the voltage value comparison section 5154 compares the voltage value $V_C$ binarized by the transistor 517 and the reference voltage value $V_0$ with each other based on the voltage value V' output by the operational amplifier 516, and based on the result, the voltage value comparison section 5154 outputs the signal for switching the power source changing-over switch 512 to ON or OFF to the switch control section 5152. Thus, the type of the external microphone 10 can be discriminated in substantially the same manner as in the first embodiment, and in accordance with the type, it is possible to switch the power source changing-over switch 512 between ON and OFF. Specifically, in the case in which the external microphone 10 is the dynamic microphone, power supply to the dynamic microphone can be prevented, thereby reliably preventing the breakdown of the external microphone 10.

Modification of Embodiments

It should be noted that although the most preferable configuration, method, and so on for putting the invention into practice are disclosed in the above descriptions, the invention is not limited thereto.

For example, although in the embodiments described above, the power supply voltage supplied to the audio signal line 56 is made to gently rise using the DC/DC converter, it is also possible to gently raise the power supply voltage using an integrator I composed of the RC circuit as shown in FIG. 5. According to this configuration, since the microcomputer 515 does not control the rise of the power supply voltage, the power source control section 5153 becomes unnecessary, and therefore, the circuit size and the control program can be made smaller. It should be noted that the integrator I is not limited to the passive RC circuit, but various configurations such as an active integrator using an operational amplifier can also be adopted.

Furthermore, in the embodiment described above, the power source changing-over switch 512 is placed between the power source device 511 and the audio signal line. However, the invention is not limited to the embodiments. For example, the power source changing-over switch 512 may be connected to an input terminal of the power source device 511 since the power source device 511 also requires the electric power to supply an output voltage to the microphone. Consequently, the output voltage for the external microphone can be controlled properly.

It is possible to integrate the microcomputer 515 with the controller 6. In this case, the A/D converter 514 and the external microphone classification information output terminal 57 are respectively connected with input ports (not shown) of the controller 6. In addition, the power source changing-over switch 512, the switching element 5111 and the control parameter input terminal 58 are connected with the output port (not shown) of the controller 6. The functions of the microcomputer 515 of the other embodiments are brought into the controller 6. Consequently, such a configuration enables the controller 6 to control the acoustic device 5 directly.

What is claimed is:

1. A power supply device comprising:
a power source device adapted to supply electric power to an external microphone via an audio signal line connected to a microphone jack, the power source device having a switching element;
a switch device adapted to switch power supply of the power source device between ON and OFF;
a voltage level detection device adapted to detect a voltage level of the audio signal line in a condition in which the power supply from the power source device is ON; and
a control device adapted to control the switch device in accordance with a type of the external microphone determined based on a detection result of the voltage level detection device,
wherein the control device controls the switching element so as to gradually raise a power supply voltage of the power source device prior to the voltage level detection device detecting the voltage level of the audio signal line.

2. The power supply device according to claim 1, further comprising:
a connection detection device adapted to detect a state of connection between the microphone jack and the external microphone,
wherein the control device is further adapted to control the switch device to switch ON power supply from the power source device upon the connection detection device detecting that the external microphone is connected to the microphone jack.

3. The power supply device according to claim 1, further comprising:
an integrator adapted to gradually raise the power supply voltage of the power source device.

4. An acoustic device provided with a microphone jack to which an external microphone is connected, comprising:
the power supply device according to claim 1.

5. A projector comprising:
a light source device;
a light modulation device adapted to modulate a light beam, which is emitted from the light source device, in accordance with image information to form image light;
a projection optical device adapted to enlargedly project the image light; and
the acoustic device according to claim 4.

6. A power supply method using a power supply device, comprising:
providing, to the power supply device, a power source device adapted to supply electric power to an external microphone via an audio signal line connected to a microphone jack, the power source device having a switching element, and a switch device adapted to switch power supply from the power source device between ON and OFF;
detecting a voltage level of the audio signal line in a condition in which the power supply from the power source device is ON; and
controlling the switch device in accordance with a type of the external microphone determined based on a detection result of the voltage level,
wherein the switching element is controlled so as to gradually raise a power supply voltage of the power source device prior to detecting the voltage level of the audio signal line.

7. The power supply device according to claim 1, wherein the control device controls the switch device to switch OFF power supply from the power source device upon determining that the type of external microphone does not require power from the power source device to operate.

8. A display apparatus comprising:
an image display device adapted to form an optical image;
a microphone jack adapted to connect with an external microphone;

an OSD controller adapted to prepare OSD screen image data about the external microphone to supply to the image display device;

a power source device adapted to supply electric power to the external microphone via an audio signal line coupled to the microphone jack;

a switch device adapted to switch power supply of the power source device between an ON and an OFF state;

a voltage level detection device adapted to detect a voltage level of the audio signal line in a condition in which the power supply from the power source device is in the ON state so as to determine whether the microphone requires electric power from the power source device to operate or whether the microphone is operational without electric power from the power source device; and a control device adapted to:
  hold the power supply from the power source in the ON state when the voltage level detection device determines that the microphone requires electric power to operate;
  switch the power supply from the power source to the OFF state when the voltage level detection device determines that the microphone is operational without electric power from the power source device.

* * * * *